(12) United States Patent
Kirsch

(10) Patent No.: US 12,202,086 B2
(45) Date of Patent: Jan. 21, 2025

(54) AUTOMATION CELL WHICH CAN BE LOADED AUTOMATICALLY AND MANUALLY

(71) Applicant: FELSOMAT GmbH & Co. KG, Koenigsbach-Stein (DE)

(72) Inventor: Roger Kirsch, Karlsbad (DE)

(73) Assignee: FELSOMAT GmbH & Co. KG, Koenigsbach-Stein (DE)

( * ) Notice: Subject to any disclaimer, the term of this patent is extended or adjusted under 35 U.S.C. 154(b) by 300 days.

(21) Appl. No.: 17/654,121

(22) Filed: Mar. 9, 2022

(65) Prior Publication Data

US 2022/0193838 A1  Jun. 23, 2022

Related U.S. Application Data

(63) Continuation of application No. PCT/EP2020/070835, filed on Jul. 23, 2020.

(30) Foreign Application Priority Data

Sep. 13, 2019 (DE) ...................... 10 2019 214 007.6

(51) Int. Cl.
*B23P 19/00* (2006.01)
*B23P 21/00* (2006.01)
(Continued)

(52) U.S. Cl.
CPC ........... *B23P 19/001* (2013.01); *B23P 21/004* (2013.01); *B23Q 11/08* (2013.01); *B65G 7/00* (2013.01);
(Continued)

(58) Field of Classification Search
CPC ....... B23P 19/001; B23P 21/00; B23P 21/004; B23Q 7/1431; B23Q 11/08; B65G 7/00;
(Continued)

(56) References Cited

U.S. PATENT DOCUMENTS

2001/0022932 A1   9/2001  Jager
2001/0031197 A1  10/2001  Jager
(Continued)

FOREIGN PATENT DOCUMENTS

CN   101742896 A   6/2010
CN   104169052 A  11/2014
(Continued)

*Primary Examiner* — Jason Holloway
*Assistant Examiner* — Blake A Wood
(74) *Attorney, Agent, or Firm* — Orbit IP, LLP; Marc G. Martino

(57) ABSTRACT

An automation unit for handling component carriers has an enclosure for arranging components carriers within a first, a second and a third stacking space. The enclosure has a loading opening for the first stacking space, a transfer device for transferring component carriers between the stacking spaces, and a separating device to selectively separate or release the first stacking space inwardly. A safety system for an intervention area is at the loading opening to interrupt the operation of the automation unit if it detects an intervention. The safety system may switch to partial monitoring mode, to full monitoring mode after completion of an automated loading process or deactivate in a manual loading mode when the separating device separates the first stacking space.

(Continued)

The safety system may switch to full monitoring mode before the separating device releases the first stacking space. The automation unit can be loaded both automatically and manually safely.

22 Claims, 10 Drawing Sheets

(51) Int. Cl.
    *B23Q 11/08*       (2006.01)
    *B65G 7/00*        (2006.01)
    *B65G 43/02*       (2006.01)
    *B65G 61/00*       (2006.01)

(52) U.S. Cl.
    CPC ............. *B65G 43/02* (2013.01); *B65G 61/00* (2013.01); *B65G 2207/40* (2013.01)

(58) Field of Classification Search
    CPC ........ B65G 43/02; B65G 60/00; B65G 61/00; B65G 2201/0258; B65G 2203/0283; B65G 2203/044; B65G 2207/40; F16P 3/12; F16P 3/144; G05B 19/0428; G05B 2219/24024; Y02T 10/70

See application file for complete search history.

(56) References Cited

U.S. PATENT DOCUMENTS

| | | |
|---|---|---|
| 2015/0112483 A1 | 4/2015 | Mougin |
| 2017/0097626 A1* | 4/2017 | Kaufleitner ............ G06V 20/52 |
| 2019/0105788 A1 | 4/2019 | Pilz et al. |

FOREIGN PATENT DOCUMENTS

| | | |
|---|---|---|
| CN | 109634269 A | 4/2019 |
| DE | 20 2005 003 596 U1 | 10/2005 |
| EP | 1 125 678 A2 | 8/2001 |
| EP | 3 211 287 A1 | 8/2017 |
| JP | H02-152730 A | 6/1990 |
| JP | H03-287331 A | 12/1991 |
| JP | 2004-353847 A | 12/2004 |
| JP | 2017-001832 A | 1/2017 |
| WO | 2016/033628 A1 | 3/2016 |

* cited by examiner

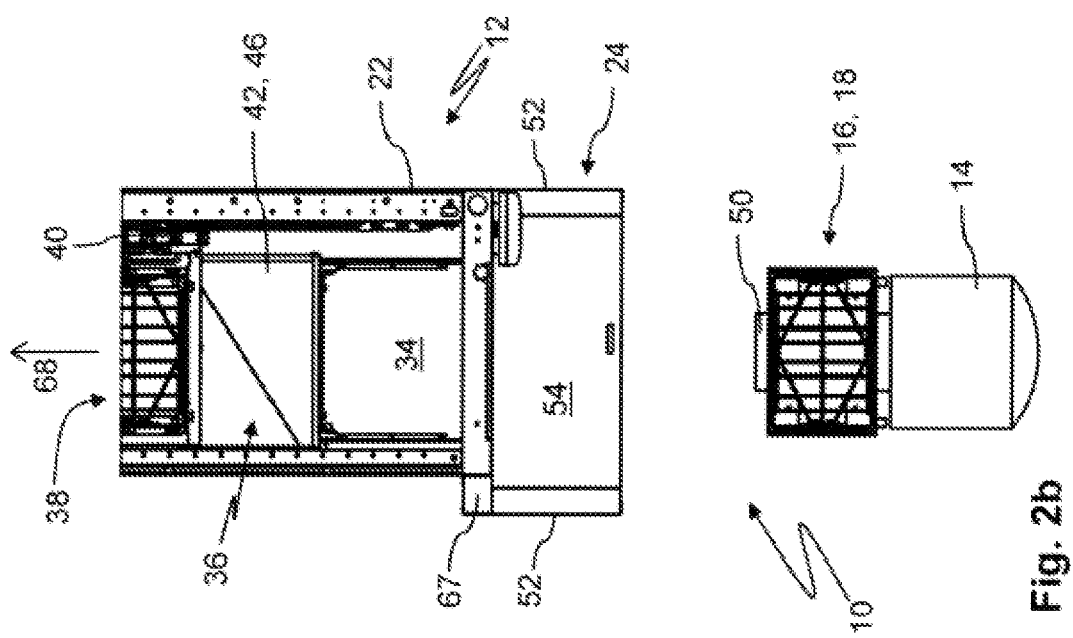
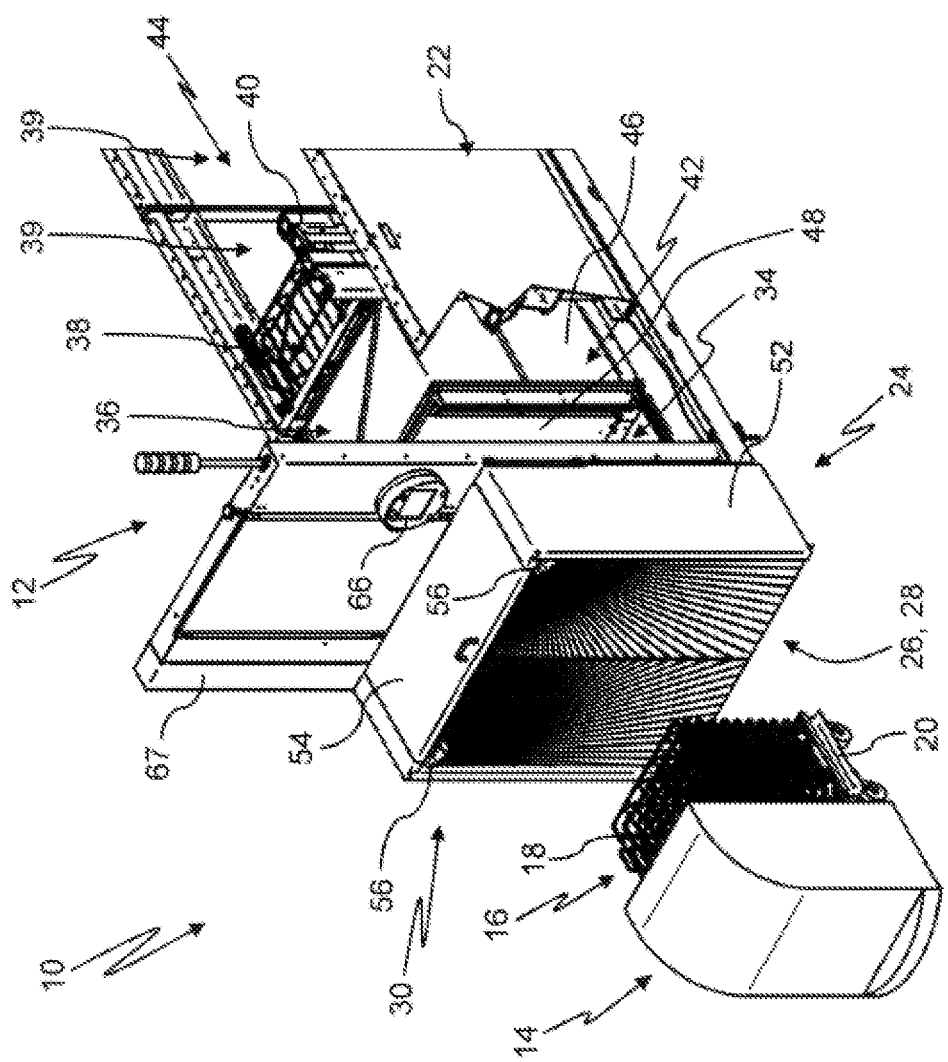
Fig. 2b
Fig. 2a

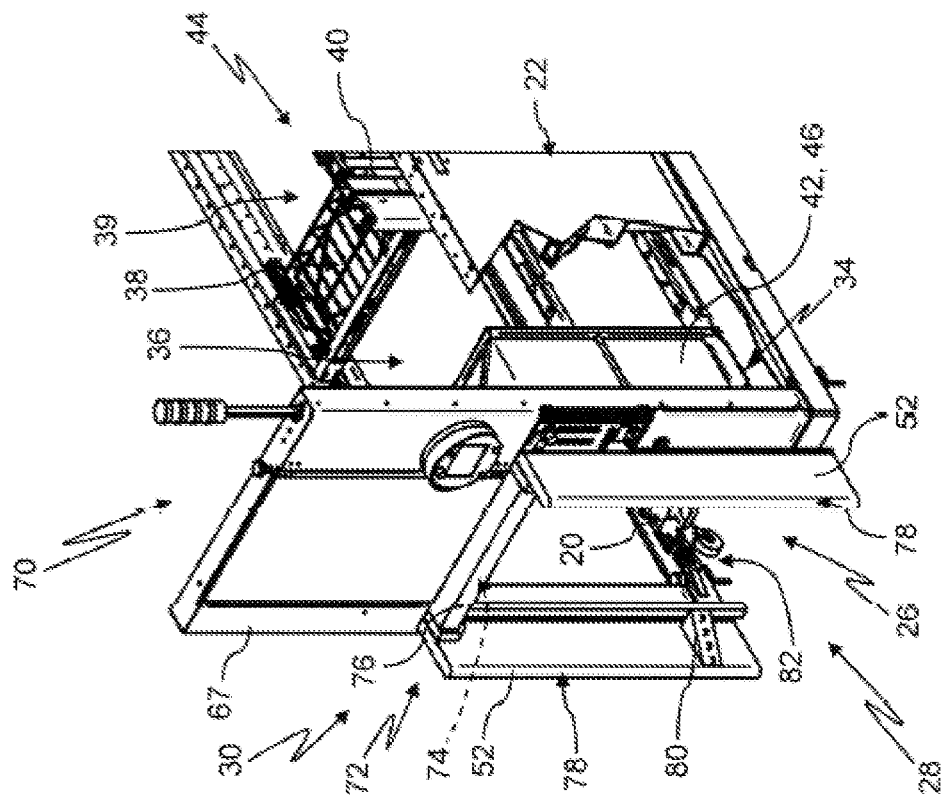
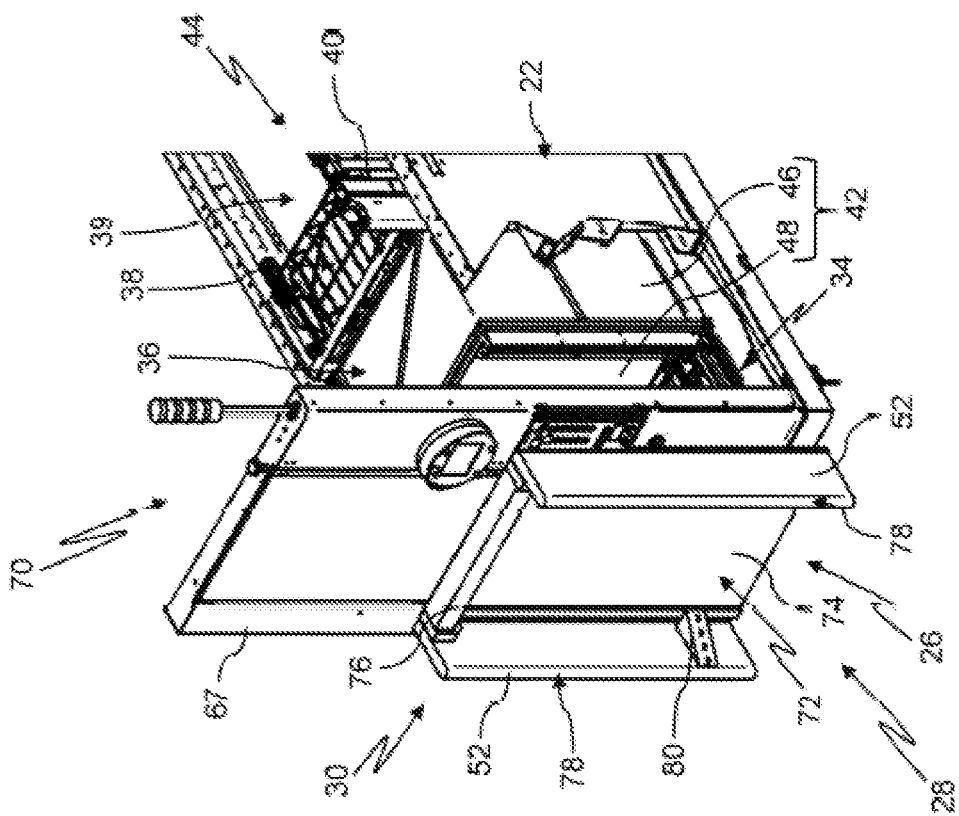

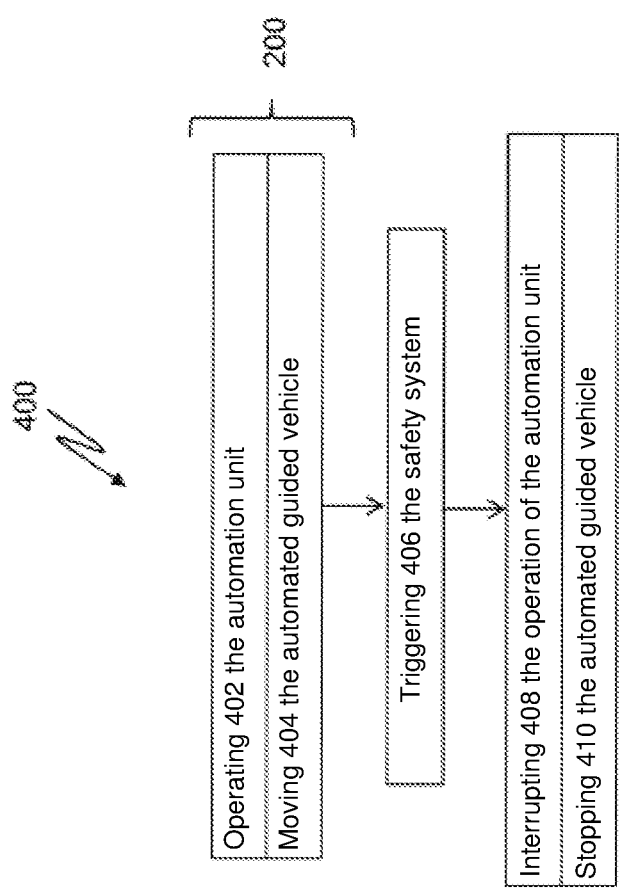

AUTOMATION CELL WHICH CAN BE LOADED AUTOMATICALLY AND MANUALLY

CROSS-REFERENCE TO RELATED APPLICATIONS

This continuation application claims priority to PCT/EP2020/070835 filed on Jul. 23, 2020 which has published as WO 2021/047810 A1 and also the German application number 10 2019 214 007.6 filed on Sep. 13, 2019, the entire contents of which are fully incorporated herein with these references.

DESCRIPTION

Field of the Invention

The invention relates to an automation unit for handling component carriers, having: an enclosure within which a first stacking space, a second stacking space and a third stacking space for component carriers are arranged, the enclosure having a loading opening for the first stacking space; a transfer device for transferring component carriers between the stacking spaces; and a separating device in order to selectively separate or release the first stacking space inwardly.

Background of the Invention

Such an automation unit is known from EP 1 125 678 B1.

Automation units are used to feed components into and out of production lines. The components are provided on component carriers. The component carriers are supplied to the automation unit or removed from the automation unit in the form of stacks. This is called loading. Within the automation unit, components are removed from the component carriers or placed in the component carriers after processing. The component carriers are restacked by means of a transfer device in order to be able to access each of the component carriers.

The automation unit known from EP 1 125 678 B1 is set up exclusively for manual loading. The automation unit has an operating door through which the loading opening can be closed or opened as desired. A hood, which can be moved over the first stacking space, is provided for separating the first stacking space. Locking elements on the hood and the operating door ensure that the operating door can only be opened when the hood is over the first stacking space. This mechanically prevents operating personnel from being able to reach into the interior of the automation unit beyond the first stacking space.

SUMMARY OF THE INVENTION

Object of the Invention

It is the object of the invention to provide an automation unit for safe operation, which automation unit can be loaded either automatically or manually.

DESCRIPTION OF THE INVENTION

This object is achieved according to the invention by an automation unit of the type mentioned at the outset, characterized in that the automation unit has a safety system for an intervention area at the loading opening, which is set up:

- to monitor the entire intervention area in a full monitoring mode,
- to monitor only a sub-area, in particular an outer sub-area, of the intervention area in a partial monitoring mode, and
- to interrupt the operation of the automation unit if the safety system detects an intervention, and in that the automation unit is set up
- to switch the safety system to partial monitoring mode in an automatic loading mode if an automated loading process has been registered beforehand, and to switch the safety system to full monitoring mode after completion of the automated loading process, and
- to deactivate the safety system in a manual loading mode when the separating device separates the first stacking space and to switch the safety system to full monitoring mode before the separating device releases the first stacking space.

The automation unit according to the invention is used for handling component carriers. During operation, the automation unit is loaded with stacks of component carriers. In the present case, loading is understood to mean both the infeed and the outfeed of a stack of component carriers through the loading opening. The stack comprises at least one component carrier, usually a plurality of component carriers. The stack is typically arranged on a transport trolley of the stack. In special cases, the stack may only comprise the transport trolley (and no component carrier). Each of the component carriers typically carries at least one component. In special cases, empty component carriers can also be fed into the automation unit or fed out of the automation unit.

The automation unit has at least three stacking spaces for component carriers, namely the first stacking space, the second stacking space and the third stacking space. The automation unit typically has more than three stacking spaces, in particular up to eleven stacking spaces. A stack of component carriers can be arranged or placed on each of the stacking spaces.

The stacking spaces are arranged within an enclosure of the automation unit, i.e. in the interior of the automation unit. The enclosure causes the interior to be sealed off from the area surrounding the automation unit. In particular, this prevents persons from being able to reach into the interior or get into the interior.

The transfer device is used to transfer one or more component carriers between the stacking spaces. This allows access to each of the component carriers. The transfer device may comprise a pallet changer. The transfer device may be movably attached to a frame or the enclosure of the automation unit. The transfer device may be designed as an automation system, for example a portal or a robot with a gripping unit.

The automation unit may comprise a handling device for handling components, in particular for removing components from one of the component carriers or inserting them into one of the component carriers. By means of the handling device, the components can in particular be supplied to a production device connected to the automation unit, typically a machine tool, or can be returned from the production device to one of the component carriers after processing has taken place.

The first stacking space is used to load the automation unit with stacks of component carriers. The first stacking space can therefore also be referred to as the loading space. The first stacking space is accessible from the outside via the loading opening. Before or after a loading process, components can also be removed from component carriers at the first stacking space or components can be placed on a component carrier at the first stacking space.

The first stacking space can be separated or released inwardly by means of the separating device. In other words, the separating device is used to separate the first stacking space from the remainder of the interior of the enclosure, in particular from the second stacking space and the third stacking space and, if applicable, further stacking spaces. In the separated state of the first stacking space, it is therefore not possible to intervene or access the interior of the automation unit from the loading opening beyond the first stacking space. Furthermore, in the separated state it is not possible for the transfer device to access the first stacking space. This can prevent danger to persons. In the released state of the first stacking space, component carriers can be exchanged between the first stacking space and a further stacking space by means of the transfer device. The separating device may comprise a hood that can be slid over the stacking spaces, in particular over the first stacking space and the second stacking space.

According to the invention, it is provided that the automation unit has a safety system for an intervention area at the loading opening. The safety system is used to monitor the intervention area and to interrupt the operation of the automation unit in the event of an intervention in the intervention area. In other words, the safety system stops the automation unit or switches off the automation unit when it detects an intervention in the intervention area. The intervention area comprises at least the loading opening and preferably a boundary area surrounding the loading opening, in particular of the enclosure.

To monitor the intervention area, the safety system can be switched to full monitoring mode or partial monitoring mode. In full monitoring mode, the safety system monitors the entire intervention area. By default, the safety system is in full monitoring mode.

In partial monitoring mode, the safety system only monitors a sub-area of the intervention area. The sub-area monitored in partial monitoring mode is preferably an outer sub-area, in other words an edge area, of the intervention area. The remaining area of the intervention area is not monitored in partial monitoring mode. In other words, in partial monitoring mode, an infeed area for a stack of components (the remaining area that is not monitored) is excluded from monitoring by the safety system. The infeed area is typically slightly larger than the stack of component carriers and/or an automated guided vehicle for transporting the stack. The safety system is preferably designed to adapt the size of the sub-area monitored in partial monitoring mode to the size of the stack of component carriers to be infed or outfed and/or the automated guided vehicle, and in particular to change it during a loading process.

According to the invention, it is also provided that the automation unit is set up to switch the safety system to partial monitoring mode in automatic loading mode if an automated loading process has been registered beforehand. In the partial monitoring mode of the safety system, a stack of component carriers can be brought automatically, for example by means of an automated guided vehicle, through the (unmonitored) infeed area of the loading opening to the first stacking space or outfed from the first stacking space. Outside the infeed area, i.e. in the monitored sub-area, the safety system also detects an intervention in partial monitoring mode. Therefore, if someone were to accidentally or intentionally reach into the intervention area next to a stack of component carriers during an automated loading process, the safety system would interrupt the operation of the automation unit to avoid injury.

After completion of the loading process, the automation unit switches the safety system back to full monitoring mode. In this way, it can be achieved that beyond the registered loading process, any intervention in the intervention area at the loading opening is recognized by the safety system and any intervention that occurs leads to an interruption of the operation of the automation unit.

According to the invention, it is also provided that the automation unit is set up to deactivate the safety system in manual loading mode when the separating device separates the first stacking space. The deactivation of the safety system is therefore only possible if the first stacking space is separated from the rest of the interior of the automation unit by the separating device. If the safety system is deactivated (switched off), i.e., if the loading opening is not monitored, a manual loading process can take place. A stack of component carriers can be brought to the first stacking space or removed from the first stacking space by an operator through the loading opening without the safety system interrupting the operation of the automation unit. The separating device ensures that the operator cannot access or penetrate beyond the first stacking space into the interior of the automation unit. This minimizes the risk of injury for the operator and helps to avoid operating errors and damage to the automation unit.

Before the separating device releases the first stacking space, the safety system is switched back to full monitoring mode. In other words, the automation unit is set up to release the first stacking space only when the safety system is in full monitoring mode. In this way, it can be achieved that in manual loading mode with the first stacking space released, any intervention in the intervention area at the loading opening is recognized by the safety system and this leads to the automation unit stopping. This further minimizes the risk of injury for operating personnel.

As a result of the different monitoring modes of the safety system in conjunction with the separating device, the automation unit according to the invention can be loaded either automatically or manually. It is not necessary to modify the automation unit. Since the safety system monitors at least a sub-area of the intervention area when the first stacking space is released, the risk of injury is effectively minimized.

The automation unit may comprise an electronic controller that controls the safety system, the transfer device, the separating device and, if applicable, the handling device. Joint control simplifies internal communication. The electronic controller can be programmed to carry out automatic and manual loading modes, as well as full monitoring and partial monitoring modes. Alternatively, provision can be made for the safety system to have its own electronic control device, which is programmed to carry out full monitoring mode and partial monitoring mode. In this case, the automation unit may have a superordinate electronic control system which is programmed to carry out the remaining operation of the automation unit.

The automation unit can advantageously be loaded manually by means of a method according to the invention described below. For automated loading, the automation unit can advantageously be expanded into an automation system according to the invention described below and loaded automatically by means of a method according to the invention described below.

PREFERRED EMBODIMENTS

In a particularly preferred embodiment, it is provided that the automation unit is set up to switch the safety system to partial monitoring mode only when there is a stack of component carriers directly in front of the loading opening. This means that it is not possible to reach into the unmonitored infeed area in front of the stack of component carriers. The stack of component carriers is located directly in front of the loading opening in particular when the distance between the stack and the loading opening is at most ten centimeters, preferably at most five centimeters, very particularly preferably at most two centimeters.

A further particularly preferred embodiment is characterized in that the safety system is designed for contactless, in particular optical, monitoring. With a contactless safety system, the sub-area to be monitored in partial monitoring mode can be flexibly defined. In particular, for each automated loading process, the size of the sub-area to be monitored—and thus the size of the unmonitored infeed area—can be adapted to the size of the stack of component carriers that has been registered for loading. This effectively prevents manual intervention in the unmonitored infeed area close to the stack of component carriers, unnoticed by the safety system. The safety system can have one or preferably two laser scanners. The safety system can be designed with a light curtain. As an alternative or in addition to optical monitoring, the safety system can be designed for acoustic monitoring, in particular by means of ultrasound.

As an alternative or in addition to contactless monitoring, it can be provided that the safety system is designed to detect contact, in particular with the security system having at least one contact protection strip. Contact detection can further reduce the risk of pinching, in particular fingers, hands, or arms. The contact protection strip is designed to trigger a signal upon touching, in particular which exceeds a predefined minimum touch force, which leads to the interruption of the operation of the automation unit. The contact protection strip can be arranged on an edge of the loading opening. Alternatively, the contact protection strip can be arranged in front of the loading opening, for example on a side panel protruding (projecting) from the enclosure. A guiding element can be arranged on the side panel between the contact protection strip and the loading opening in order to guide a stack of component carriers to the loading opening.

An advantageous embodiment is characterized in that the safety system has a closing device for the loading opening. When the safety system is in full monitoring mode, the closing device closes the loading opening. In the closed state, the closing device prevents intervention in the loading opening. The safety system is designed to trigger a signal, which leads to the operation of the automation unit being interrupted, if an attempt is made to open the closing device in full monitoring mode. In partial monitoring mode, the loading opening can be fully or partially releasable by the closing device. When the safety system is in a deactivated state, the closing device can completely release the loading opening. The closing device can be opened manually or by motor. The closing device can be designed with a roller door or a sectional door.

In an advantageous development of this embodiment, it is provided that the closing device and the separating device have a common separating element, which can be arranged either to close the loading opening or to separate the first stacking space. In this way it can be achieved that the separating element either closes the loading opening or separates the first stacking space inwardly. It is therefore mechanically ensured that, when the loading opening is open, it is not possible to reach into the interior of the automation unit beyond the first stacking space, in particular to the second stacking space or the third stacking space or into a working area of the transfer device. At the same time, when the loading opening is closed by means of the separating element, the separating element is removed from the interior of the automation unit so that it does not impede movement of the transfer device and transfer of component carriers between the stacking spaces, in particular from or to the first stacking space. The separating element is preferably part of a sectional door.

A particularly preferred embodiment of the automation unit is characterized in that the loading opening is formed on a front structure of the enclosure. The front structure establishes a spacing of the loading opening from the first stacking space. In the event of an unauthorized intervention in the loading opening, there is more time to interrupt the operation of the automation unit. It can thus be reliably achieved that the automation unit, in particular the transfer device, is stopped before an object penetrating through the loading opening without authorization, in particular a hand or a ballistically moved object, reaches the first stacking space. This effectively prevents possible injuries and/or damage to the automation unit. The front structure typically protrudes from a wall, in particular a vertical wall, of the enclosure which adjoins the first stacking space. In other words, the front structure protrudes outwards from the enclosure. The front structure typically surrounds the loading opening at the side and preferably also at the top.

In a particularly preferred development of this embodiment, it is provided that the front structure has a roof segment which can be brought into a covering position and into an open position. The roof segment is in the covering position for automated loading of the first stacking space in automatic loading mode. In the covering position, the roof segment helps protect against unauthorized entry to the first stacking space. For manual loading of the first stacking space in manual loading mode, the roof segment is typically transferred to the open position. This simplifies manual loading of the automation unit as the open roof segment allows an operator to get close to the first stacking space. It can be provided that the roof segment can only be moved into the open position when the separating device separates the first stacking space inwardly. The roof segment can be pivoted and/or displaced between the covering position and the open position.

An advantageous embodiment of the automation unit is characterized in that an alignment device for aligning a stack of component carriers is provided at the first stacking space. The stack of component carriers can be brought into a suitable position for further processing, in particular by means of the transfer device, using the alignment device. The alignment device can preferably align the stack of component carriers with respect to all three translational and all three rotational degrees of freedom. The alignment device can be designed to align the component carriers indirectly via a transport trolley of the stack. The transport trolley then forms an interface for the alignment device, so that the alignment device does not have to be adapted for different types of component carriers, which in particular can have different heights.

In a particularly preferred embodiment of the automation unit, it is provided that the stacking spaces are arranged one behind the other in a longitudinal direction, and that the loading opening is aligned for loading in the longitudinal direction. Such an automation unit can be integrated into a production plant in a particularly space-saving manner. In particular, as a result of the loading taking place in the longitudinal direction, only a small area is required in order to bring stacks of component carriers to or from the automation unit. In other words, in this embodiment, the stacking spaces are one behind the other in a straight line. Stacks of component carriers are passed through the loading opening along this straight line. To facilitate this, the loading opening typically extends transversely to the longitudinal direction. In other words, a plane defined by the loading opening preferably runs perpendicular to the longitudinal direction.

Automation System According to the Invention:

The scope of the present invention also includes an automation system comprising an automation unit according to the invention as described above and an automated guided vehicle for transporting a stack of component carriers. Using the automated guided vehicle, the automation unit can be loaded particularly efficiently in automatic loading mode. The automated guided vehicle (AGV) is preferably designed to drive under and lift a transport trolley for a stack of component carriers. For this purpose, the automated guided vehicle can have a lifting device.

The automation system can advantageously be automatically loaded by means of a method according to the invention described below. Furthermore, the automation system allows the advantageous execution of an operating method according to the invention, described below, with manual and automated loading.

A particularly preferred embodiment of the automation system is characterized in that the safety system is set up to stop the automated guided vehicle when the safety system detects an intervention at the loading opening. This can prevent persons from being trapped between the automation unit and the automated guided vehicle or a stack of component carriers on the automated guided vehicle. In particular, even during an automated loading process in which the safety system is in partial monitoring mode, the automated guided vehicle is stopped immediately in the event of an intervention in the monitored sub-area. This embodiment can be operated safely within the scope of an operating method according to the invention described below with triggering of the safety system.

In an advantageous embodiment, it is provided that the automated guided vehicle is set up to register a loading process with the automation unit. This simplifies communication between the automated guided vehicle and the automation unit. The registration can take place in particular when the automated guided vehicle is located directly in front of the automation unit, in particular directly in front of the loading opening. In this way it can be achieved in a simple and efficient manner that full monitoring mode of the safety system is set up when a loading process is imminent. The automated guided vehicle is located directly in front of the automation unit or the loading opening in particular when the distance between the automated guided vehicle or a transported stack of component carriers and the automation unit or the loading opening is no more than ten centimeters, preferably no more than five centimeters, very particularly preferably no more than two centimeters.

A particularly preferred development of this embodiment is characterized in that the automated guided vehicle is set up to inform the automation unit of the size of a stack of component carriers to be infed through the loading opening, and in that the safety system is set up to adapt the size of the sub-area of the intervention area monitored in partial monitoring mode to the reported size of the stack of component carriers. In other words, the safety system is set up to adapt the size of the infeed area, which is not monitored in partial monitoring mode, to the size of the stack to be infed. It can thereby be achieved that even during the infeed of small stacks, i.e. stacks with few component carriers or only one transport trolley, no body parts or whole persons or objects can be inserted through the loading opening unnoticed by the safety system. For this purpose, the size of the monitored sub-area can be adapted to the size of the stack to be infed in such a way that the stack fits through the unmonitored infeed area, taking into account the usual deviations of the automated guided vehicle. A boundary of the monitored sub-area can follow an enveloping contour of the stack at a small distance, in particular at a distance of at most ten centimeters, preferably at most five centimeters, particularly preferably at most two centimeters.

The automation system is preferably set up for secure communication between the automation unit and the automated guided vehicle. Communication disruptions, which could result in compromised safety, can be avoided in this way. A safety level of secure communication preferably corresponds to at least performance level C, category 3, particularly preferably performance level D, category 4, according to DIN EN ISO 13849-1. Redundantly operating communication devices can be provided on the automation unit and the automated guided vehicle.

Manual Loading Method According to the Invention:

A method for manually loading an automation unit according to the invention as described above also falls within the scope of the invention, with the steps of:

a) separating the first stacking space inwardly,
 b) deactivating the safety system,
 c) infeeding and/or outfeeding a stack of component carriers through the loading opening,
 d) activating the safety system,
 e) releasing the first stacking space.

This method allows safe manual loading of the automation unit. For this purpose, the safety system is only deactivated after the first stacking space has been separated; likewise, the first stacking space is only released after the safety system has been reactivated. The method steps are carried out in the specified order. If the automation unit has a closing device and a covering device with a common separating element, steps a) and b) as well as d) and e) can be carried out simultaneously.

When carrying out the manual loading method, the automation unit is by principal in manual loading mode. In particular, it can be switched to manual loading mode before step a) is carried out. In the event of an intervention in the intervention area before step b) or after step d), the operation of the automation unit is interrupted.

While the method is being carried out, in particular also while step c) is being carried out, the automation unit typically continues to operate, i.e. component carriers in particular are moved between the second stacking space and the third stacking space and, if applicable, further stacking spaces by means of the transfer device. This increases the efficiency of the automation unit. If necessary, components are also removed from the component carriers on the second stacking space and/or the third stacking space and, if applicable, the further stacking spaces or inserted into them by means of a handling device.

If the automation unit has a front structure with an openable roof segment, the roof segment is brought into its open position between steps b) and c) and brought into its covering position between steps c) and d). Opening the roof segment simplifies manual loading; closing the roof segment increases safety during further operation.

If the automation unit has a safety system with a closing device for the loading opening, the closing device is opened manually or by a motor in step b), preferably fully opened, and closed manually or by a motor in step d).

Automated Loading Method According to the Invention:

A method for automatically loading the automation unit of an automation system according to the invention as described above also falls within the scope of the present invention, with the steps of:
  A) monitoring the entire intervention area at the loading opening,
  B) registering an automated loading process with the automation unit,
  C) monitoring a sub-area, in particular an outer sub-area, of the intervention area,
  D) infeeding and/or outfeeding a stack of component carriers through the loading opening by means of the automated guided vehicle,
  E) monitoring the entire intervention area.

This method allows efficient and safe automated loading of the automation unit. For this purpose, the monitoring of the intervention area is only restricted to the sub-area after an automated loading process has been registered with the automation unit; after the end of the loading process, the monitoring is again extended to the entire intervention area. The method steps are carried out in the specified order, with the monitoring of the entire intervention area according to step A) continuing while step B) is being carried out, and with the monitoring of the sub-area according to step C) continuing while step D) is being carried out.

When carrying out the automated loading process, the automation unit is by principle in automatic loading mode. In particular, it can be switched to automatic loading mode before step A) is carried out. The monitoring of the entire intervention area in step A) takes place in full monitoring mode of the safety system.

The automated loading process in step B) is preferably registered by the automated guided vehicle. The transition to step C) preferably only takes place when the automated guided vehicle has brought a stack of component carriers directly in front of the loading opening or is itself located directly in front of the loading opening. The automated guided vehicle or the stack is located directly in front of the loading opening in particular when the distance between the automated guided vehicle or the stack of component carriers and the loading opening is no more than ten centimeters, preferably no more than five centimeters, very particularly preferably no more than two centimeters.

The monitoring of the sub-area in step C) takes place in partial monitoring mode of the safety system. To carry out step C), the safety system is switched to partial monitoring mode. A size of the monitored sub-area is preferably adapted to the size of the stack of component carriers to be infed or outfed. The automation unit can be informed of the size of the stack to be infed by the automated guided vehicle. The size of the monitored sub-area can in particular be adapted such that a boundary of the monitored sub-area follows an enveloping contour of the stack at a small distance, in particular at a distance of at most ten centimeters, preferably at most five centimeters, particularly preferably at most two centimeters.

Provision can furthermore be made for the size of the monitored sub-area to be changed during the infeed or outfeed process. In particular, the size of the monitored sub-area can differ when the stack of component carriers is passed through and when a housing section of the automated guided vehicle is passed through. This is particularly useful if the loading opening is formed on a front structure of the enclosure, since the loading opening is then at a distance from the first stacking space, as a result of which the stack of component carriers cannot be placed directly behind the loading opening. In this case, the automated guided vehicle has to drive a little way into the front structure. The size of the monitored sub-area can in particular be changed in such a way that a boundary of the monitored sub-area follows an enveloping contour of a section of the stack or automated guided vehicle to be just now guided through the loading opening at a small distance, in particular at a distance of at most ten centimeters, preferably at most five centimeters, particularly preferably at most two centimeters.

While the method is being carried out, in particular also while step D) is being carried out, operation of the automation unit typically continues, i.e. component carriers in particular are moved between the second stacking space and the third stacking space and, if applicable, further stacking spaces by means of the transfer device. If necessary, components are also removed from the component carriers on the second stacking space and/or the third stacking space and, if applicable, the further stacking spaces or inserted into them by means of a handling device.

The monitoring of the entire intervention area in step E) takes place in full monitoring mode of the safety system. To carry out step E), the safety system is switched to full monitoring mode.

In the event of an intervention in the intervention area or its sub-area, operation of the automation unit is terminated.

If the automation unit has a closing device for the loading opening, the closing device is fully or partially opened in step C). To carry out step E), the closing device is closed again.

Operating Method According to the Invention for Manual and Automatic Loading:

The scope of the present invention also includes an operating method for an automation system according to the invention as described above, characterized in that at least one cycle of a manual loading method according to the invention described above and at least one cycle of an automated loading method according to the invention described above are carried out. This operating method allows an efficient change between automated and manual loading of the automation unit. In principle, the automation unit is not modified between the process cycles in manual and automatic loading mode; in particular, no structural changes are made to the automation unit and/or no components of the automation unit are exchanged, removed and/or added.

Operating Method According to the Invention with Triggering of the Safety System:

Finally, the scope of the present invention includes an operating method for an automation system according to the invention as described above, in which the safety system is set up to stop the automated guided vehicle, with the steps of
  K) operating the automation unit and automatically moving the automated guided vehicle in an area surrounding the automation unit, in particular infeeding and/or outfeeding a stack of component carriers through the loading opening by means of the automated guided vehicle,
  L) triggering the safety system,
  M) interrupting the operation of the automation unit and stopping the automated guided vehicle by means of the safety system.

This operating method effectively reduces the risk to operating personnel, in particular the risk of being trapped between the automation unit and the automated guided vehicle. The method steps are carried out in the specified order. Step K) can advantageously be carried out as part of a method for automated loading according to the invention as described above. When the safety system is triggered, it can be in partial monitoring mode or in full monitoring mode. The safety system can be triggered by manual intervention or by the automated guided vehicle.

In a variant of this method, stopping the automated guided vehicle while the safety system is in full monitoring mode is subject to the additional condition that the automated guided vehicle is in close proximity, for example no more than three meters away from the automation unit. As a result, an unnecessary stopping of the automated guided vehicle can be avoided if it is located sufficiently far away from the automation unit, so that in particular persons cannot be trapped. In this variant, it is fundamentally provided that the automated guided vehicle is stopped as soon as it has reached the immediate vicinity of the automation unit and in particular if the intervention that triggered the safety system continues. The further advance of the automated guided vehicle into the immediate vicinity can preferably only take place after it has been confirmed that the triggering intervention has been cleared.

Further advantages of the invention can be found in the description and the drawings. The aforementioned features and those which are to be explained below can each be used individually for themselves or for a plurality of expedient combinations of any kind. The embodiments shown and described are not to be understood as an exhaustive enumeration but rather have exemplary character for the description of the invention.

BRIEF DESCRIPTION OF THE DRAWINGS

The invention is illustrated in the drawings and is explained in more detail using embodiments. In the drawings:

FIG. 2a shows the automation system from FIG. 1, wherein an optical safety system monitors an entire intervention area at a loading opening for a first stacking space of the automation unit, in a schematic perspective view with the enclosure of the automation unit shown in partially broken form;

FIG. 2b shows the automation system according to FIG. 2a in a schematic plan view;

FIG. 8 shows an automation unit according to the invention, wherein a safety system comprises a closing device for the loading opening and contact protection strips on side panels next to the loading opening, wherein the closing device closes the loading opening, in a schematic perspective view with the enclosure shown in partially broken form;

FIG. 9 shows the automation unit from FIG. 8 with the closing device open and the first stacking space separated by a separating device, in a schematic perspective view with the enclosure shown in partially broken form;

FIG. 14 shows a schematic flowchart of an operating method for an automation system with triggering of a safety system for the loading opening.

DESCRIPTION OF THE PREFERRED EMBODIMENTS

Figure 1:
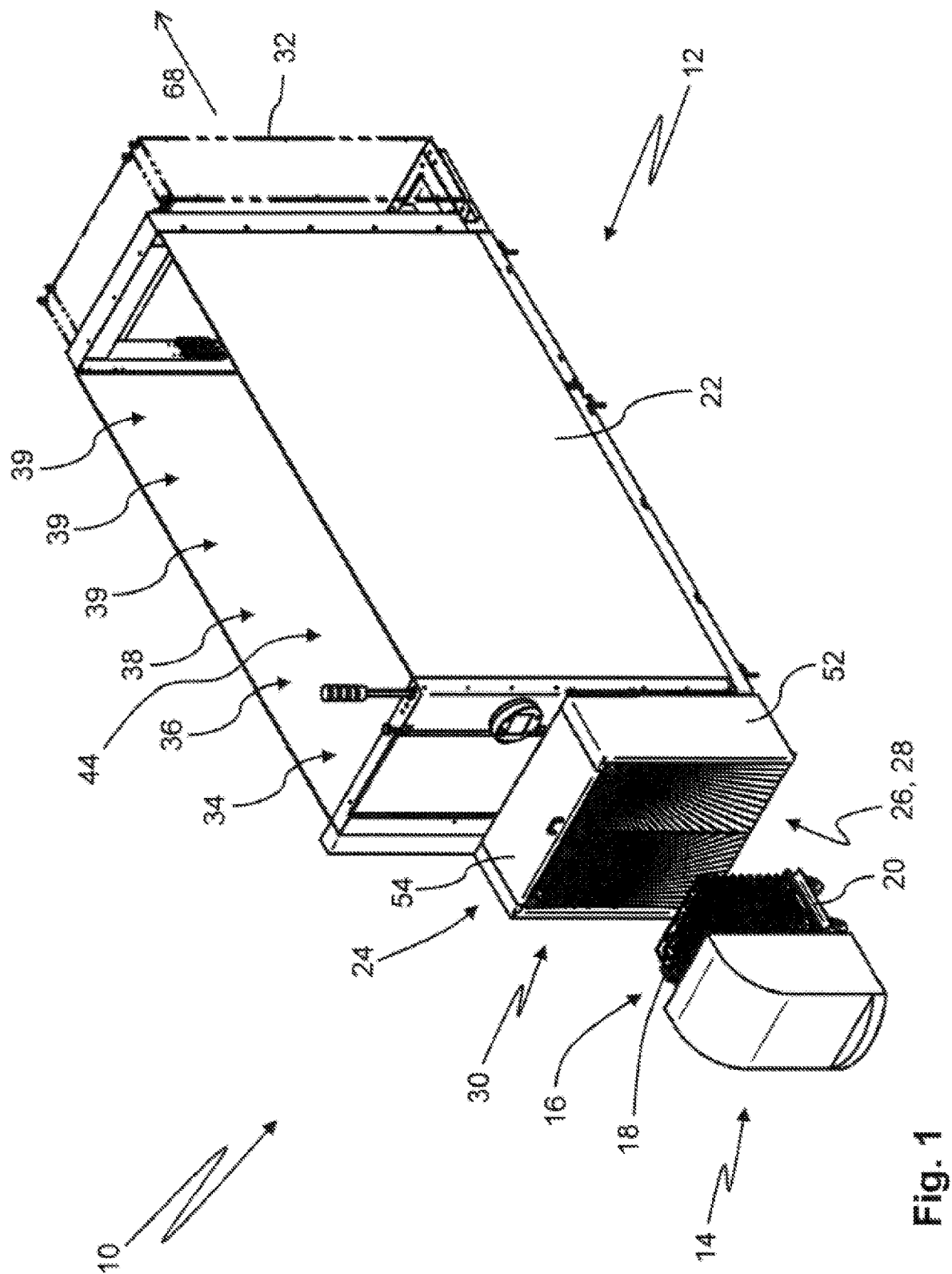
FIG. 1 shows an automation system according to the invention with an automation unit according to the invention and an automated guided vehicle for transporting a stack of component carriers, in a schematic overview.

FIG. 1 shows an automation system 10 according to the invention. The automation system 10 comprises an automation unit 12 according to the invention and an automated guided vehicle 14. The automated guided vehicle 14 transports a stack 16 of component carriers 18 which are arranged on a transport trolley 20.

The automation unit 12 has an enclosure 22. A front structure 24, on which a loading opening 26 is formed, protrudes from the enclosure 22. An intervention area 28 at the loading opening 26 is monitored by a safety system 30. The automation unit 12 can have a control cabinet 32, which is arranged here on the rear of the enclosure 22. An electronic controller (not shown in detail) for the automation unit 12 can be provided in the control cabinet 32.

FIG. 2a shows a section of the automation system 10 from FIG. 1. The enclosure 22 is shown in FIG. 2 in partially removed or broken form. A first stacking space 34, a second stacking space 36, a third stacking space 38 and a plurality of further stacking spaces 39 are formed within the enclosure 22. A stack 16 of component carriers 18 can be arranged on each of the stacking spaces 34, 36, 38, 39. The automation unit 12 has a transfer device 40. By means of the transfer device 40, component carriers 18 can be transferred individually or in groups between the stacking spaces 34, 36, 38, 39. The transfer device 40 is designed in this case with a pallet changer.

The automation unit 12 has a separating device 42 for the first stacking space 34. The first stacking space 34 can be separated inwardly (from the remainder of the interior 44 of the enclosure 22 with the stacking spaces 36, 38, 39) or released by means of the separating device 42. In this case, the separating device 42 comprises a displaceable hood 46 and a bulkhead wall 48. The hood 46 is displaceable over the stacking spaces 34, 36, 38, 39; in particular, the hood 46 can be arranged over the first stacking space 34 or the second stacking space 36. The bulkhead wall 48 is fixed between the first stacking space 34 and the second stacking space 36. The hood 46 is located in this case over the second stacking space 36, cf. also FIG. 2b, so that the separating device 42 releases the first stacking space 34.

It can also be seen in FIG. 2b that the automated guided vehicle 14 has a lifting device 50 for driving under and lifting the transport trolley 20 of the stack 16.

The front structure 24 of the enclosure 22 has two side panels 52 and a roof segment 54. In the configuration shown in FIGS. 2a and 2b, the roof segment 54 is in a covering position. The two side panels 52 and the roof segment 54 surround the loading opening 26 from the side and from above.

The safety system 30 of the automation unit 12 is designed for contactless, in this case optical, monitoring of the intervention area 28 at the loading opening 26. The safety system 30 has two laser scanners 56. The laser scanners 56 can each be arranged in upper corners of the front structure 24 at the loading opening 26.

In FIG. 2a, the safety system 30 is in full monitoring mode. In full monitoring mode, the safety system 30 monitors the entire intervention area 28. In full monitoring mode, the laser scanners 56 are set up to detect any intervention in the loading opening 26. If the safety system 30 detects an intervention in the intervention area 28, the safety system 30 interrupts operation of the automation unit 12 and sends the automated guided vehicle 14 a command that forces it to stop. When the operation of the automation unit 12 is interrupted, the transfer device 40 in particular is stopped. If present, a handling device (not shown here) of the automation unit 12 is also stopped. The handling device serves to handle components that are provided on the component carriers 18 and are also not shown in detail.

FIGS. 2a and 2b show the automation system 10 in a state at the beginning of an automated loading process. For automated loading, the automation unit 12 is in automatic loading mode. The automated guided vehicle 14 has registered the loading process to be carried out with the automation unit 12. When the automated guided vehicle 14 with the stack 16 has moved directly (e.g. to less than eight centimeters) in front of the loading opening 26, the safety system 30 is switched to partial monitoring mode, which allows the stack 16 to be infed through the loading opening 26 to the first stacking space 34.

The automation unit 12 and the automated guided vehicle 14 can each have redundant communication devices that are not shown in detail. Secure communication can be set up between the automation unit 12 and the automated guided vehicle 10 by means of the redundant communication devices. (Secure) communication includes in particular the registration of a loading process by the automated guided vehicle 14 with the automation unit 12 and the sending of a stop command from the automation unit 12 to the automated guided vehicle 14 if the safety system 30 is triggered.

Figure 3:
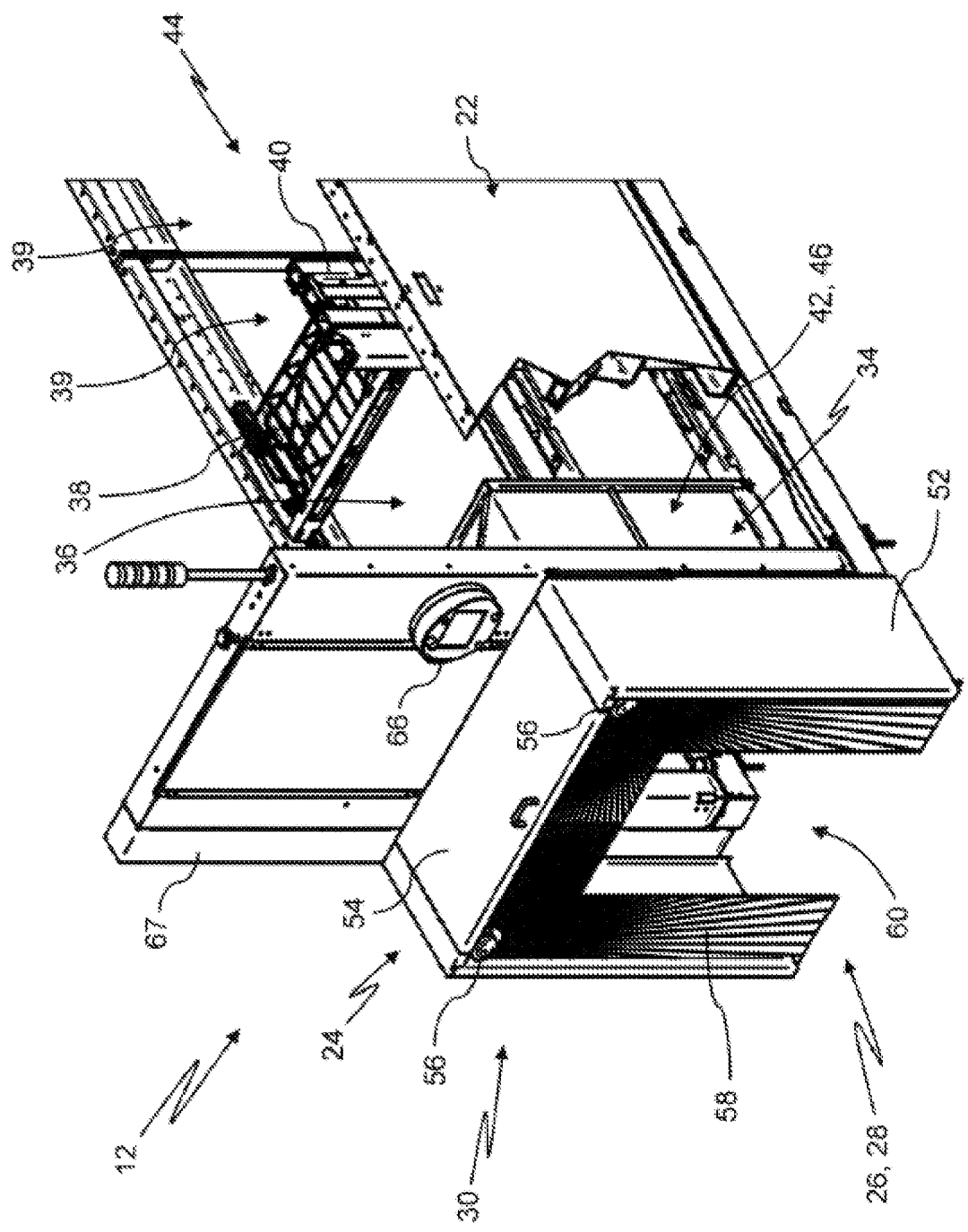
FIG. 3 shows the automation unit of the automation system from FIG. 1, wherein the safety system monitors only an outer sub-area of the intervention area at the loading opening and wherein a separating device separates the first stacking space from an interior, in a schematic perspective view with the enclosure shown in partially broken form.

FIG. 3 shows the automation unit 12 with the safety system 30 in partial monitoring mode. In partial monitoring mode, the safety system 30 only monitors a sub-area 58 of the intervention area 28, in this case an outer sub-area. An infeed area 60, in this case an inner infeed area, is excluded from monitoring. A distinction can be made between an intervention in the monitored sub-area 58 and the non-monitored infeed area 60 in that the safety system 30 determines a location of an intervention in the intervention area 28, with an intervention in the monitored sub-area 58 leading to the safety system 30 being triggered, whereas an intervention in the non-monitored infeed area 60 is tolerated without further reaction. The size, in particular the height and/or width, of the monitored sub-area 58 or of the non-monitored infeed area 60 can be matched to the size of the stack 16 or the automated guided vehicle 14.

It can also be seen in FIG. 3 that the hood 46 is located over the first stacking space 34 so that the separating device 42 separates the first stacking space 34. Because the loading opening 26 is monitored by the safety system 30, however, this separation is not absolutely necessary in automatic loading mode.

Figure 4B:
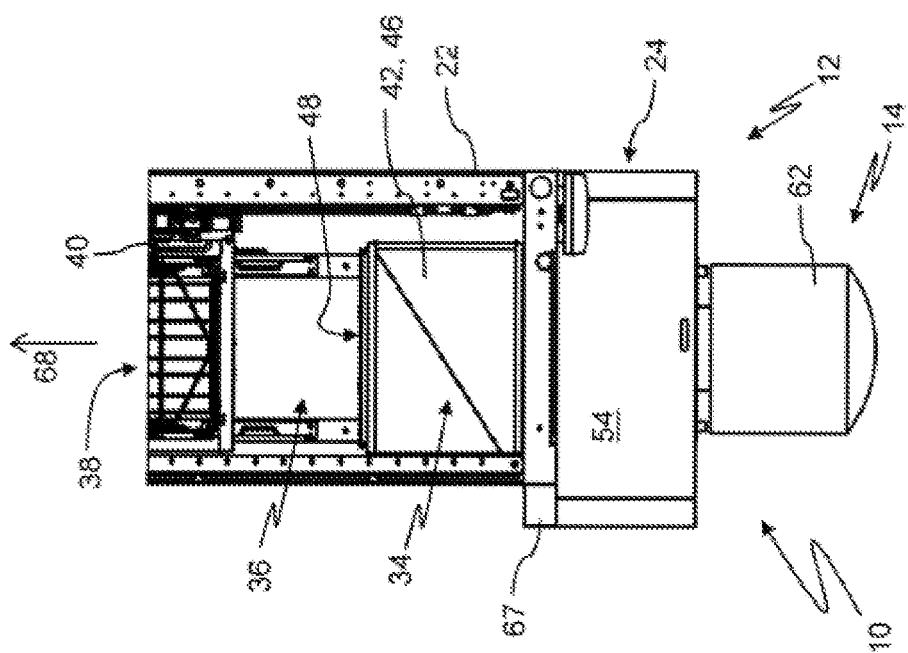
FIG. 4b shows the automation system according to FIG. 4a in a schematic plan view.
Figure 4A:
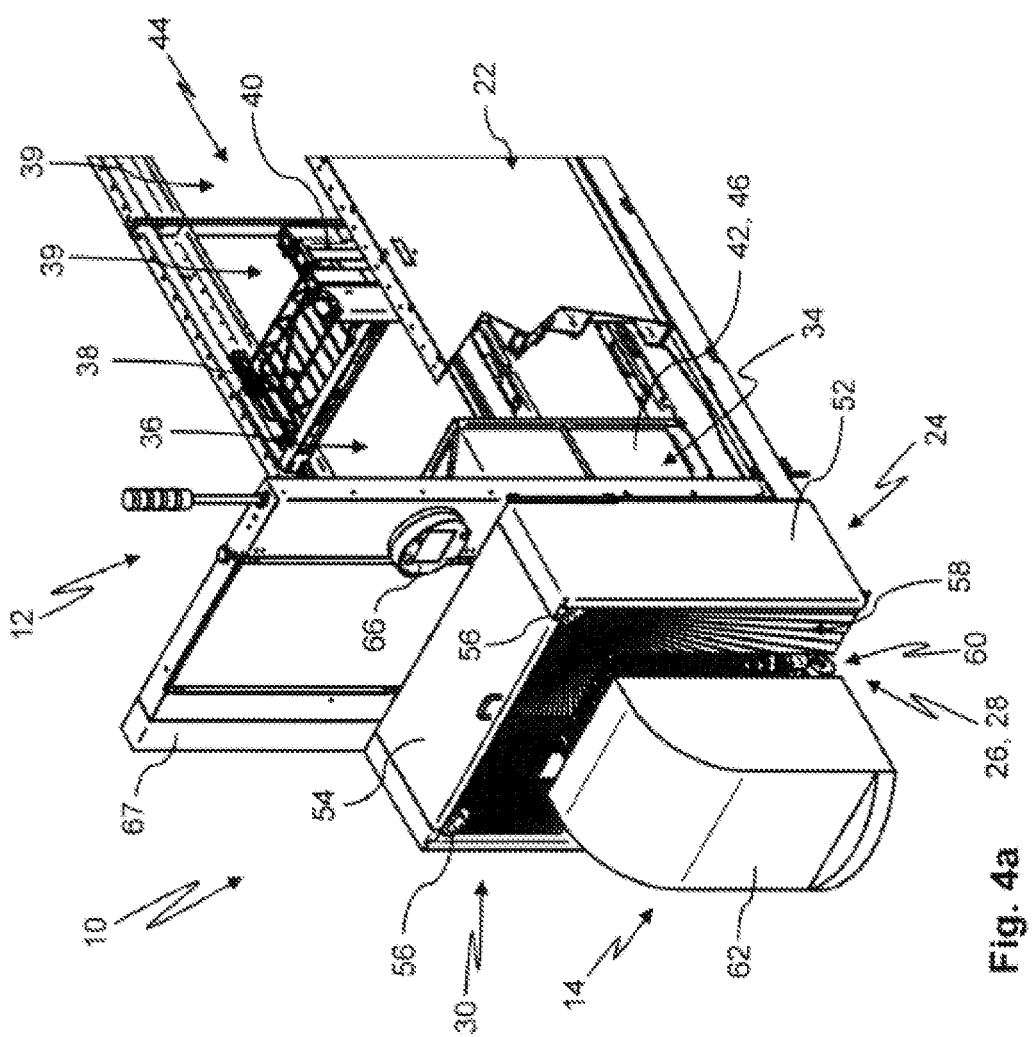
FIG. 4a shows the automation system from FIG. 1, wherein the automation unit is in the state according to FIG. 3 and wherein the automated guided vehicle infeeds a stack of component carriers through the loading opening, in a schematic perspective view with the enclosure shown in partially broken form.

FIGS. 4a and 4b show the automation system 10 from FIG. 1 during the infeed of the stack 16 through the loading opening 26. In the configuration shown, the stack 16 has been brought almost completely through the loading opening 26 by the automated guided vehicle 14. The safety system 30 then adjusted the size of the monitored sub-area 58 and therefore the size of the infeed area 60 such that a housing 62 of the automated guided vehicle 14 can pass through the loading opening 26 without the safety system 30 being triggered.

As the loading process continues, the automated guided vehicle 14 will move the stack 16 to the first stacking space 34 and then move away from the automation unit 12 again. After the automated guided vehicle 14 has left the loading opening 26, the safety system 30 is switched back to full monitoring mode.

Figure 5:
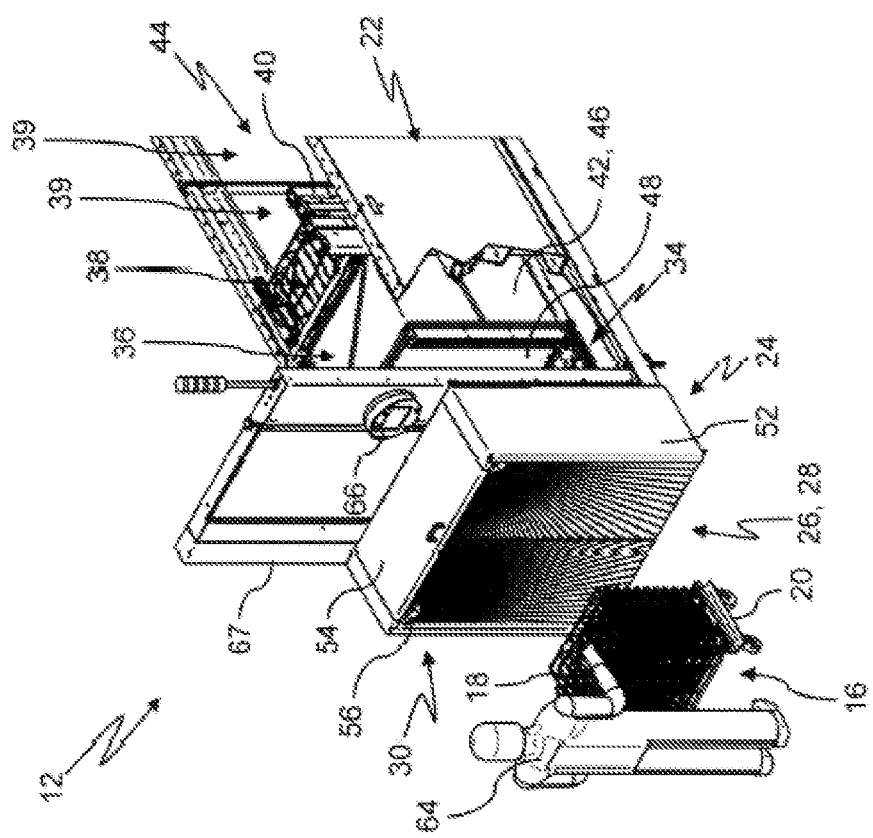
FIG. 5 shows the automation unit of the automation system from FIG. 1 before a manual loading process is carried out by an operator, wherein the safety system monitors the entire intervention area at the loading opening and wherein the first stacking space is released by the separating device, in a schematic perspective view with the enclosure shown in partially broken form.

FIG. 5 shows the automation unit 12 from FIG. 1 in a state at the beginning of a manual loading process. For manual loading, the automation unit 12 is switched to manual loading mode. This can be done by an operator 64 making a corresponding entry on an operator terminal 66 of the automation unit 12.

In FIG. 5, the safety system 30 is in full monitoring mode, so that any intervention in the loading opening 26 is detected and causes the automation unit 12 to stop. The hood 46 of the separating device 42 can be located above the second stacking space 36, so that the first stacking space 34 is released.

After the operator 64 has registered the manual loading process, the first stacking space 34 is initially separated inwardly by means of the separating device 42. For this purpose, the hood 46 is moved over the first stacking space 34. The safety system 30 is then deactivated. This state is shown in FIG. 6.

Since the front structure 24 protrudes from a wall 67, which is in this case vertical, of the enclosure 22, on the one hand it causes the loading opening 26 to be at a distance from the first stacking space 34, so that in the event of an intervention (with the safety system 30 activated), there is more time to interrupt the operation of the automation unit 12. On the other hand, the roof segment 54 in particular hinders the operator 64 when loading the first stacking space 34.

Figure 6:
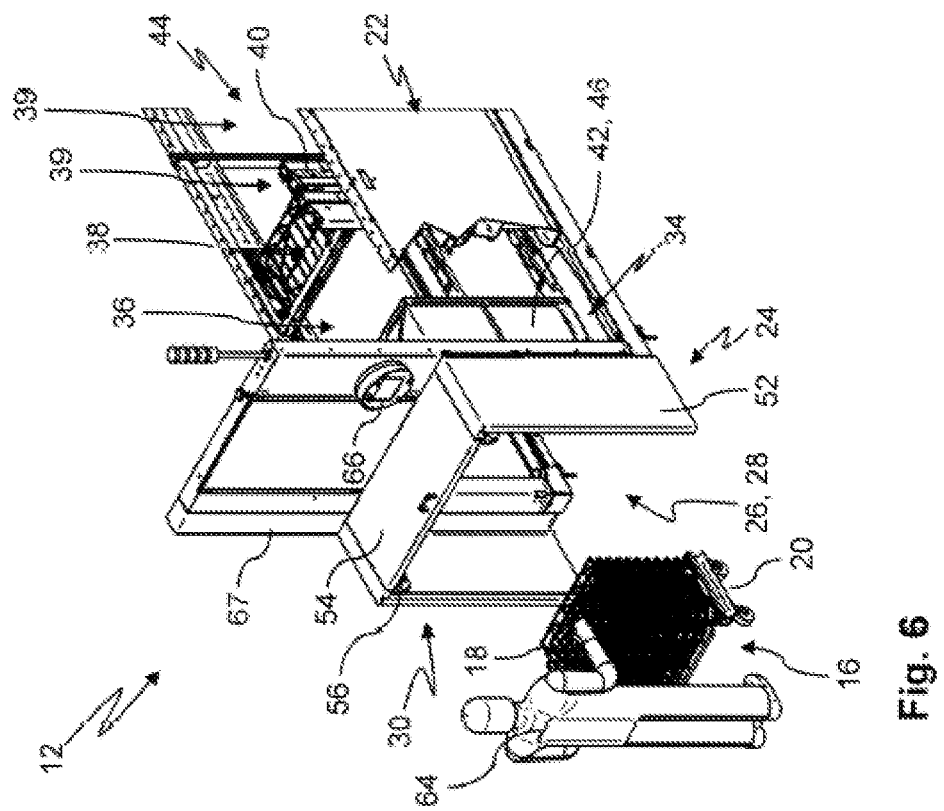
FIG. 6 shows the automation unit and the operator from FIG. 5, wherein the separating device separates the first stacking space, the safety system is deactivated and a roof segment of a front structure of the enclosure is in a covering position, in a schematic perspective view with the enclosure shown in partially broken form.
Figure 7:
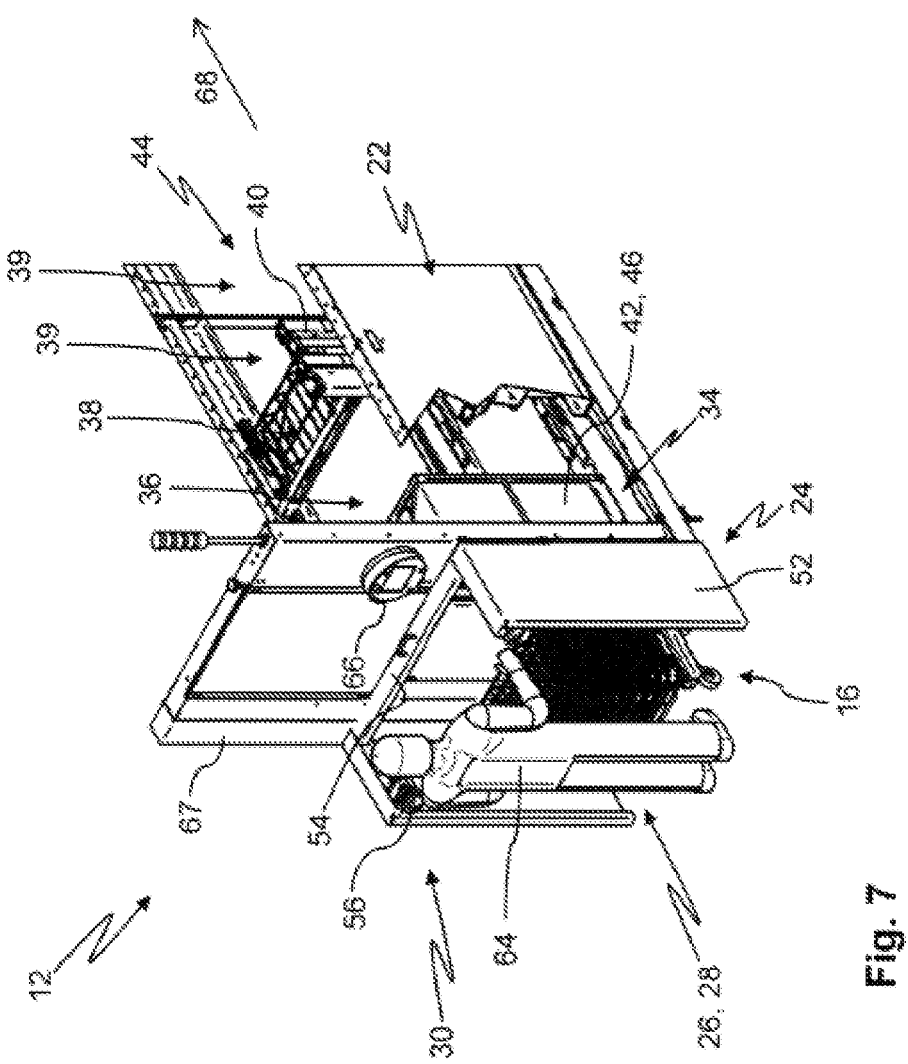
FIG. 7 shows the automation unit and the operator from FIG. 5, wherein the roof segment is in an open position and the operator brings a stack of component carriers through the loading opening to the first stacking space, in a schematic perspective view with the enclosure shown in partially broken form.

In order to simplify loading, after the safety system 30 has been deactivated, the operator 64 can bring the roof segment 54 of the front structure 24 out of the covering position, cf. FIGS. 5 and 6, into an open position, see FIG. 7. For this purpose, the roof segment 54 can be pushed inwards (over the first stacking space 34). The safety system 30 may monitor the position of the roof segment 54 such that when the safety system 30 is activated, an attempt to open the roof segment 54 will trigger the safety system 30 and consequently interrupt the operation of the automation unit 12. Opening the roof segment 54 makes it easier for the operator 64 to move the stack 16 to the first stacking space 34. In order to push the stack 16 onto the first stacking space 34 with the transport trolley 20, the operator 64 can step through the loading opening 26 to just in front of the first stacking space 34 when the roof segment 54 is open. The operator 64 does not have to bend down or stretch through the loading opening 26 for this purpose.

The manual or automated loading processes described above with reference to FIGS. 2a to 7, with the infeed of a stack 16 of component carriers 18 through the loading opening 26 onto the first stacking space 34, can also be carried out, with appropriate adjustments, in order to outfeed a stack 16 of component carriers 18 from the first stacking space 34.

In the automation unit 12, the stacking spaces 34, 36, 38, 39 are arranged one behind the other in a longitudinal direction 68, cf. also FIG. 1. In other words, the stacking spaces 34, 36, 38, 39 lie on a straight line. The loading, i.e. the infeed and outfeed of a stack 16 of component carriers 18 through the loading opening 26, takes place along the longitudinal direction 68. For this purpose, the loading opening 26 can be arranged to run transversely to the longitudinal direction 68.

FIG. 8 shows an automation unit 70. With the exception of a safety system 30, the automation unit 70 corresponds to the automation unit 12 from FIG. 1. In this respect, reference is made to the above description.

The safety system 30 of the automation unit 70 has a closing device 72 for a loading opening 26. The closing device 72 is designed here with a roller door 74 which can be rolled up into a box 76 arranged on the upper side of the loading opening. In FIG. 8, the closing device 72 is in a closed position; the roller door 74 closes the loading opening 26. The closed position of the closing device 72 is set up in full monitoring mode of the safety system 30. In full monitoring mode, an attempt to open the closing device 72 leads to the operation of the automation unit 70 being interrupted and possibly to an automated guided vehicle 14 of an automation system 10 with the automation unit 70 being stopped.

The safety system 30 also has two contact protection strips 78. The contact protection strips 78 are arranged laterally next to the loading opening 26 in this case. The contact protection strips 78 are triggered when touched. When the contact protection strips 78 are triggered, the safety system 30 interrupts operation of the automation unit 70 and, if necessary, stops the automated guided vehicle 14. As a result, an operator 64 (cf. FIGS. 5 to 7) being trapped between the automation unit 70 and the automated guided vehicle 14 can be avoided.

The contact protection strips 78 can be integrated into side panels 52 which protrude from a wall 67 of an enclosure 22 of the automation unit 70, which wall in this case runs vertically. Guiding elements 80 can be arranged on the side panels 52 in order to simplify the infeed of a stack 16 of component carriers 18 in the loading opening 26.

An intervention area 28 that can be monitored by the safety system 30—and is monitored in full monitoring mode—comprises the loading opening 26 and the region of the contact protection strips 78. In partial monitoring mode, a sub-area monitored by the safety system 30 can comprise the region of the contact protection strips 78 and—when the closing device 72 is partially closed—the covered part of the loading opening 26.

FIG. 9 shows the automation unit 70 in partial monitoring mode of the safety system 30. In partial monitoring mode, the automation unit 70 can be loaded automatically. In this case, the closing device 72 is open for partial monitoring mode. The roller door 74 (cf. FIG. 8) has been raised and is accommodated in the box 76. As a result, the first stacking space 34 is accessible from the outside. The contact protection strips 78 are also active in partial monitoring mode and stop the automation unit 70 and, if necessary, the automated guided vehicle 14 if they are touched.

The contact protection strips 78 of the safety system 30 can be deactivated for manual loading. This avoids (harmless) contact leading to an interruption in the operation of the automation unit 70.

In manual loading mode of the automation unit 70, the closing device 72 can only be opened when the first stacking space 34 has been separated from the remainder of the interior 44 of the enclosure 22 by means of a separating device 42. For this purpose (as described above), a hood 46 can be moved over the first stacking space 34. In automatic loading mode of the automation unit 70, the closing device 72 can also be opened when the first stacking space 34 has been released, if the automated guided vehicle 14 is located directly in front of the loading opening 26.

The automation unit 70 can have an alignment device 82 at the first stacking space 34. A stack 16 of component carriers 18 can be precisely aligned by means of the alignment device 82 after it has been brought to the first stacking space 34. This simplifies the transfer of component carriers 18 by means of a transfer device 40. The alignment device 82 can act on a transport trolley 20 of the stack 16 for aligning. The alignment device 82 can also be provided in the automation unit 12 from FIG. 1.

Figure 10:
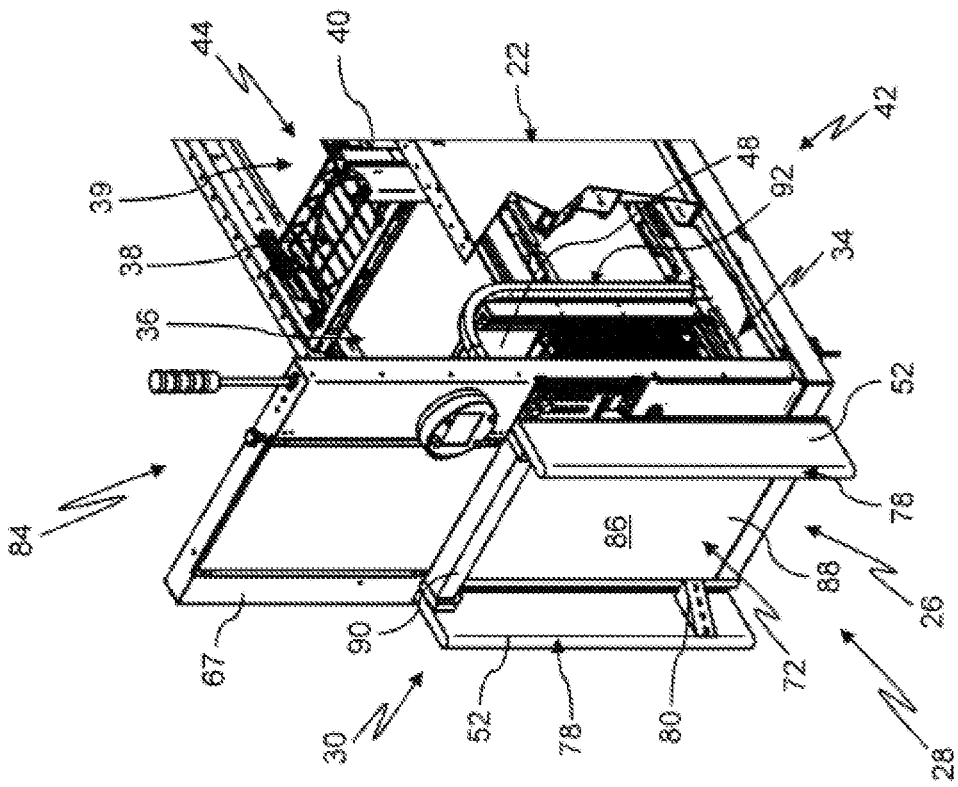
FIG. 10 shows an automation unit according to the invention, in which a closing device for the loading opening and a separating device for the first stacking space have a common separating element, which in this case closes the loading opening and which alternatively can be arranged to separate the first stacking space, in a schematic perspective view with the enclosure shown in partially broken form.

FIG. 10 shows an automation unit 84. In the automation unit 84, a closing device 72 and a separating device 42 have a common separating element 86. The separating element 86 can be arranged either to close a loading opening 26 or to separate a first stacking space 34. The separating element 86 is part of a sectional door 88 in this case. A drive 90 of the sectional door 88 can be arranged on top of the loading opening 26. The closing device 72 is shown closed in FIG. 10. The separating element 86 closes the loading opening 26. When the closing device 72 is opened, the separating element 86 is guided over and behind the first stacking space 34 by means of a rail arrangement 92. Partition walls of the separating device 42, which partition walls are not shown in more detail and are in particular fixed, can be arranged to the side of the first stacking space 34. A bulkhead wall 48 of the separating device 42, which bulkhead wall is in particular fixed, can be arranged between the first stacking space 34 and the second stacking space 36.

Otherwise, the automation unit 84 corresponds in structure and function to the automation unit 70 from FIG. 8. In this respect, reference is made to the above description.

Figure 11:
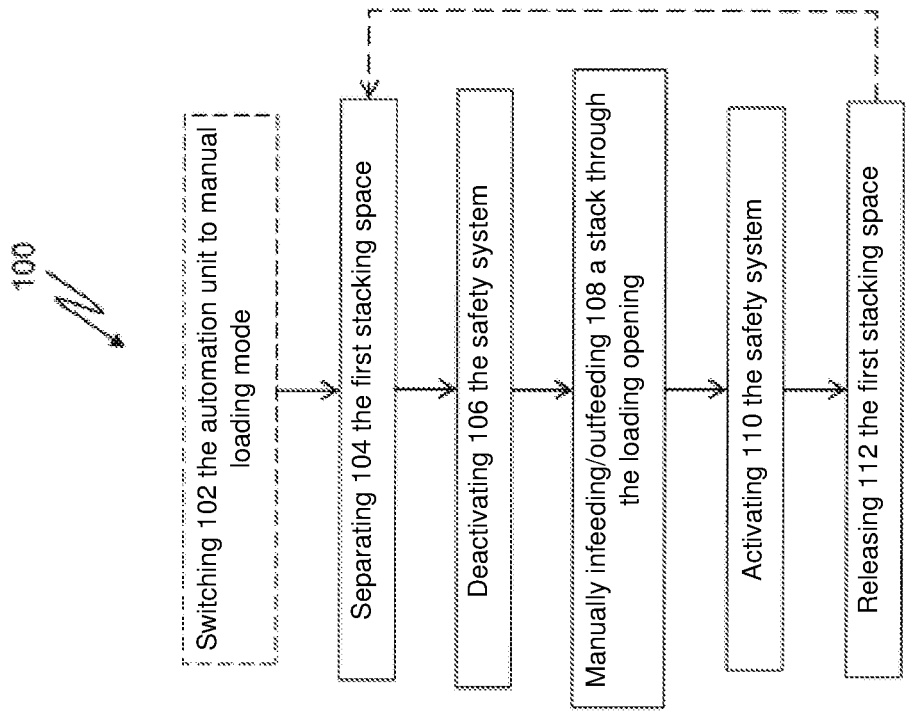
FIG. 11 shows a schematic flowchart of a method according to the invention for the manual loading of an automation unit.

FIG. 11 shows a schematic flowchart of a method 100 for the manual loading of an automation unit. The method is described here by way of example using the automation unit 12 from FIG. 1. The method 100 can also be carried out with the automation unit 70 from FIG. 8 or the automation unit 84 from FIG. 10.

If the automation unit 12 is in automatic loading mode at the beginning of the method 100, the automation unit 12 is first switched to manual loading mode in step 102.

In step 104, the first stacking space 34 is separated by means of the separating device 42. The safety system 30 is then deactivated in step 106. The roof segment 54 of the front structure 24 can then be opened. In step 108, an operator 64 can now load the first stacking space 34 through the loading opening 26. The operator 64 can first outfeed a first stack 16 of component carriers 18 with processed components from the first stacking space 34 through the loading opening 26 and then bring a second stack 16 of component carriers 18 with components to be processed through the loading opening 26 to the first stacking space 34.

The safety system 30 is then reactivated in step 110. If necessary, the roof segment 54 may be closed beforehand. Then, in step 112, the first stacking space 34 is released by the separating device 42.

Further manual loading processes can then be carried out, cf. the dashed arrow in FIG. 11. It should be noted that the component carriers 18 outfed from the first stacking space 34 in a subsequent process cycle are typically not those component carriers 18 that were brought to the first stacking space 34 in the immediately preceding loading process, but rather other component carriers 18 that were stacked using the transfer device 40 have reached the first stacking space 34. A transport trolley 20 on the first stacking space 34 is not restacked as a matter of principle, but outfed again after it has been infed during the next loading process.

Figure 12:
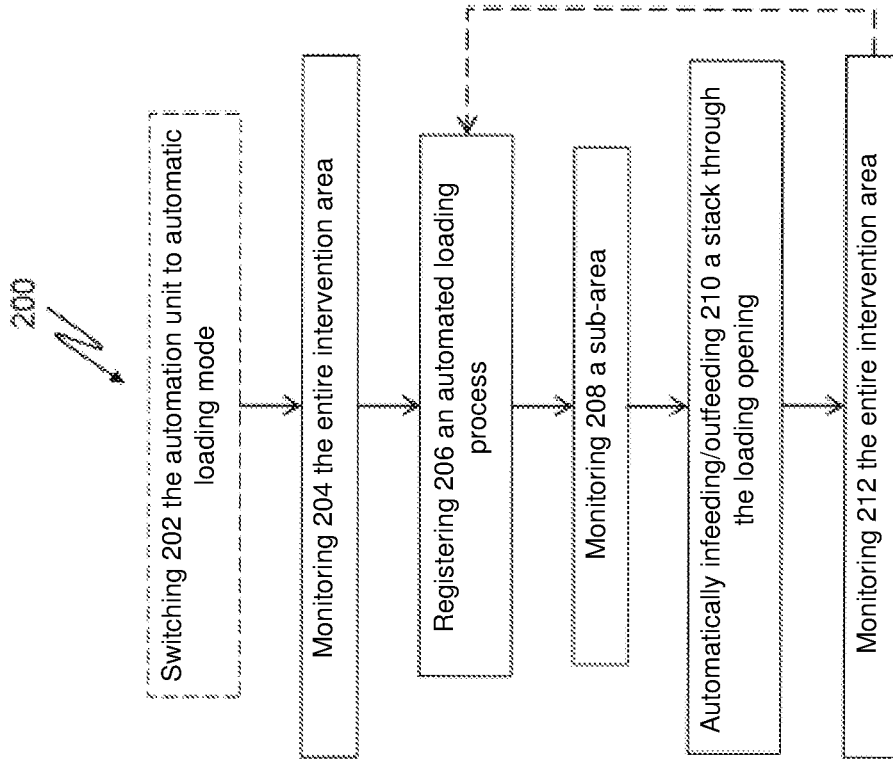
FIG. 12 shows a schematic flowchart of a method according to the invention for the automated loading of an automation unit of an automation system.

FIG. 12 shows a schematic flowchart of a method 200 for the automated loading of an automation system 10. The method is described here by way of example using the automation system 10 with the automation unit 12 from FIG. 1. The method 200 can also be carried out with an automation system with the automation unit 70 from FIG. 8 or with the automation unit 84 from FIG. 10.

If the automation unit 12 is in manual loading mode at the beginning of the method 200, the automation unit 12 is first switched to automatic loading mode in step 202.

In full monitoring mode of the safety system 30, the entire intervention area 28 at the loading opening 26 is initially monitored in step 204. During full monitoring operation, an automated loading process is registered with the automation unit 12 in step 206, in particular by the automated guided vehicle 14.

If the automated guided vehicle 14 is located directly in front of the loading opening 26, the safety system 30 is switched to partial monitoring mode, so that in step 208, a sub-area 58 of the intervention area 28 is monitored. During the monitoring of the sub-area 58 in partial monitoring mode, the first stacking space 34 is automatically loaded in step 210. First, a first stack 16 of component carriers 18 can be outfed from the first stacking space 34 through the loading opening 26 by means of the automated guided vehicle 14. A second stack 16 of component carriers 18 can then be brought through the loading opening 26 to the first stacking space 34 by means of the same or another automated guided vehicle 14. A size of the monitored sub-area 58 can be adapted to the respective stack 16 for infeeding or outfeeding the stack 16. The size of the monitored sub-area 58 can also be changed while the stack 16 is being guided through the loading opening 26, for example if a housing 62 of the automated guided vehicle 14 is to pass through the loading opening 26.

Finally, in step 212, the safety system 30 is switched back to full monitoring mode so that the entire intervention area 28 is monitored. Further automated loading processes can then be carried out, cf. the dashed arrow in FIG. 12.

Figure 13:
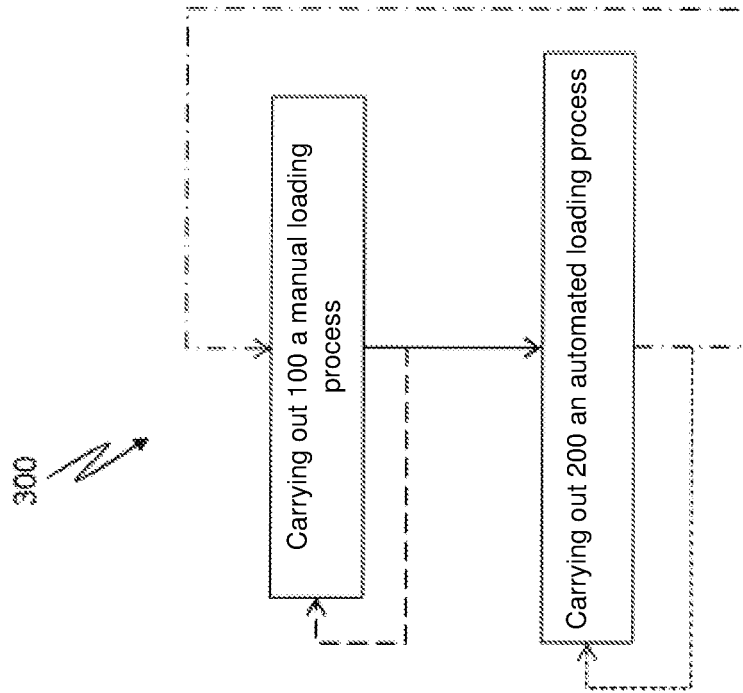
FIG. 13 shows a schematic flowchart of an operating method with manual and automated loading of an automation unit of an automation system.

FIG. 13 shows a schematic flowchart of an operating method 300 for an automation system 10. The automation system 10 can be configured, for example, with the automation unit 12 from FIG. 1, the automation unit 70 from FIG. 8 or the automation unit 84 from FIG. 10.

First, one cycle or a plurality of cycles of the manual loading method 100 according to FIG. 11 are carried out. Then one cycle or a plurality of cycles of the automated loading method 200 according to FIG. 12 are carried out. Subsequently, cycles of the manual loading process 100 can be carried out again, and so on.

FIG. 14 shows a schematic flowchart of an operating method 400 for an automation system 10. The automation system 10 can be configured, for example, with the automation unit 12 from FIG. 1, the automation unit 70 from FIG. 8 or the automation unit 84 from FIG. 10.

As part of an automated loading method 200, cf. FIG. 12, the automation unit 12 is operated in step 402 and the automated guided vehicle 14 is automatically moved in step 404 in the area surrounding the automation unit 12. Meanwhile, at least a sub-area 58 or the entire intervention area 28 at the loading opening 26 is monitored by the safety system 30. In step 406, the safety system 30 is triggered by an intervention in the intervention area 28 or the monitored sub-area 58. In step 408, the operation of the automation unit 12 is then interrupted by the safety system 30 and in step 410, the automated guided vehicle 14 is stopped at the command of the safety system 30.

LIST OF REFERENCE SIGNS

Automation system 10
Automation unit 12, 70, 84
Automated guided vehicle 14
Stack 16
Component carrier 18
Transport trolley 20
Enclosure 22
Front structure 24
Loading opening 26
Intervention area 28
Safety system 30
Control cabinet 32
First stacking space 34
Second stacking space 36
Third stacking space 38
Further stacking spaces 39
Transfer device 40
Separating device 42
Interior 44
Hood 46
Bulkhead wall 48
Lifting device 50
Side panels 52
Roof segment 54
Laser scanner 56
Sub-area 58
Infeed area 60
Housing 62
Operator 64

Operator terminal 66
Wall 67
Longitudinal direction 68
Closing device 72
Roller door 74
Box 76
Contact protection strips 78
Guiding elements 80
Alignment device 82
Separating element 86
Sectional door 88
Drive 90
Rail arrangement 92
Method 100 for manual loading
Switching 102 to manual loading mode
Separating 104 the first stacking space 34
Deactivating 106 the safety system 30
Manually infeeding and/or outfeeding 108 a stack 16
Activating 110 the safety system 30
Releasing 112 the first stacking space 34
Method 200 for automated loading
Switching 202 to automatic loading mode
Monitoring 204 the entire intervention area 28
Registering 206 an automated loading process
Monitoring 208 a sub-area 58
Automatically infeeding and/or outfeeding 210 a stack 16
Monitoring 212 the entire intervention area 28
Operating method 300 with manual and automated loading
Operating method 400 with triggering of the safety system 30
Operating 402 the automation unit 12, 70, 84
Moving 404 the automated guided vehicle 14
Triggering 406 of the safety system 30
Interrupting 408 the operation of the automation unit 12, 70, 84
Stopping 410 the automated guided vehicle 14

What is claimed is:

1. An automation unit for handling component carriers, comprising:
   an enclosure within which a first stacking space, a second stacking space and a third stacking space for component carriers are arranged, the enclosure having a loading opening for the first stacking space;
   a transfer device configured for transferring component carriers between the stacking spaces; and
   a separating device in order to selectively separate or release the first stacking space inwardly;
   wherein the automation unit has a safety system for an intervention area at the loading opening, which is set up to:
      monitor the entire intervention area in a full monitoring mode;
      monitor only a sub-area of the intervention area in a partial monitoring mode; and
      to interrupt the operation of the automation unit if the safety system detects an intervention;
   wherein the automation unit is set up to:
      switch the safety system to partial monitoring mode in an automatic loading mode if an automated loading process has been registered beforehand, and to switch the safety system to full monitoring mode after completion of the automated loading process; and
      deactivate the safety system in a manual loading mode when the separating device separates the first stacking space and to switch the safety system to full monitoring mode before the separating device releases the first stacking space.

2. The automation unit according to claim 1, wherein the automation unit is set up to switch the safety system to partial monitoring mode only when a stack of component carriers is located immediately in front of the loading opening.

3. The automation unit according to claim 1, wherein the safety system is designed for contactless monitoring.

4. The automation unit according to claim 1, wherein the safety system is designed to detect contact with the safety system.

5. The automation unit according to claim 1, wherein the safety system has a closing device for the loading opening.

6. The automation unit according to claim 5, wherein the closing device and the separating device have a common separating element, which can be arranged either to close the loading opening or to separate the first stacking space.

7. The automation unit according to claim 1, wherein the loading opening is formed on a front structure of the enclosure.

8. The automation unit according to claim 7, wherein the front structure has a roof segment which can be brought into a covering position and into an open position.

9. The automation unit according to claim 1, wherein an alignment device for aligning a stack of component carriers is provided at the first stacking space.

10. The automation unit according to claim 1, wherein the stacking spaces are arranged one behind the other in a longitudinal direction, and wherein the loading opening is aligned for loading in the longitudinal direction.

11. An automation system comprising the automation unit according to claim 1 and an automated guided vehicle for transporting a stack of component carriers.

12. The automation system according to claim 11, wherein the safety system is set up to stop the automated guided vehicle when the safety system detects an intervention at the loading opening.

13. An operating method for the automation system according to claim 12, comprising the steps of:
   K) operating the automation unit and automatically moving the automated guided vehicle in an area surrounding the automation unit;
   L) triggering the safety system; and
   M) interrupting the operation of the automation unit and stopping the automated guided vehicle by means of the safety system.

14. The method according to claim 13, wherein a stack of component carriers is infed and/or outfed through the loading opening by means of the automated guided vehicle.

15. The automation system according to claim 11, wherein the automated guided vehicle is set up to register a loading process with the automation unit.

16. The automation system according to claim 15, wherein the automated guided vehicle is set up to inform the automation unit of the size of a stack of component carriers to be infed through the loading opening, and wherein the safety system is set up to adapt the size of the sub-area of the intervention area monitored in partial monitoring mode to the reported size of the stack of component carriers.

17. The automation system according to claim 11, wherein the automation system is set up for secure communication between the automation unit and the automated guided vehicle.

18. A method for the automated loading of the automation unit of the automation system according to claim 11, comprising the steps of:
   A) monitoring the entire intervention area at the loading opening;
   B) registering an automated loading process with the automation unit;
   C) monitoring a sub-area, in particular an outer sub-area, of the intervention area;
   D) infeeding and/or outfeeding a stack of component carriers through the loading opening by means of the automated guided vehicle; and
   E) monitoring the entire intervention area.

19. An operating method for the automation system according to claim 11, characterized in that at least one cycle is carried out of a method for the manual loading of the automation unit, comprising the steps of:
   a) separating the first stacking space inwardly;
   b) deactivating the safety system;
   c) infeeding and/or outfeeding a stack of component carriers through the loading opening;
   d) activating the safety system; and
   e) releasing the first stacking space;
and at least one cycle is carried out of a method for the automated loading of the automation unit, comprising the steps of:
   A) monitoring the entire intervention area at the loading opening;
   B) registering an automated loading process with the automation unit;
   C) monitoring a sub-area, in particular an outer sub-area, of the intervention area;
   D) infeeding and/or outfeeding a stack of component carriers through the loading opening by means of the automated guided vehicle; and
   E) monitoring the entire intervention area.

20. A method for the manual loading of the automation unit according to claim 1, comprising the steps of:
   a) separating the first stacking space inwardly;
   b) deactivating the safety system;
   c) infeeding and/or outfeeding a stack of component carriers through the loading opening;
   d) activating the safety system; and
   e) releasing the first stacking space.

21. The automation unit according to claim 1, wherein the safety system is designed for contactless optical monitoring.

22. The automation unit according to claim 1, wherein the safety system is designed to detect contact with at least one contact protection strip of the safety system.

* * * * *